(12) United States Patent
Ruden et al.

(10) Patent No.: US 8,459,622 B2
(45) Date of Patent: Jun. 11, 2013

(54) NONCONTACT POSITIONING OF A WORKPIECE

(75) Inventors: Shawn Allen Ruden, Shakopee, MN (US); Bryan Charles Roberts, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 376 days.

(21) Appl. No.: 12/764,796

(22) Filed: Apr. 21, 2010

(65) Prior Publication Data

US 2011/0260383 A1 Oct. 27, 2011

(51) Int. Cl.
*B25B 11/00* (2006.01)
*B23Q 1/25* (2006.01)

(52) U.S. Cl.
USPC .................................. 269/8; 269/55; 29/559

(58) Field of Classification Search
USPC ........... 269/3, 6, 8, 43, 45, 71, 75, 55; 29/559
See application file for complete search history.

(56) References Cited

U.S. PATENT DOCUMENTS

| | | | | |
|---|---|---|---|---|
| 3,935,486 A * | 1/1976 | Nagashima | ................ | 310/12.06 |
| 4,485,339 A * | 11/1984 | Trost | ................ | 318/640 |
| 4,742,286 A * | 5/1988 | Phillips | ................ | 318/640 |
| 4,893,980 A | 1/1990 | Balter | | |
| 5,163,651 A * | 11/1992 | Matsumoto | ................ | 248/425 |
| 5,660,381 A * | 8/1997 | Suzuki | ................ | 269/73 |
| 5,760,564 A * | 6/1998 | Novak | ................ | 318/687 |
| 5,982,128 A * | 11/1999 | Lee | ................ | 318/568.16 |
| 6,144,118 A * | 11/2000 | Cahill et al. | ................ | 310/12.06 |
| 6,152,281 A | 11/2000 | Bednarz et al. | | |
| 6,184,972 B1 * | 2/2001 | Mizutani et al. | ................ | 355/72 |
| 6,212,759 B1 | 4/2001 | Liu et al. | | |
| 6,220,799 B1 * | 4/2001 | Okutani et al. | ................ | 409/164 |
| 6,322,265 B1 * | 11/2001 | Mindek et al. | ................ | 400/648 |
| 6,361,034 B1 * | 3/2002 | Wolfe | ................ | 269/8 |
| 6,538,348 B2 * | 3/2003 | Sawai et al. | ................ | 310/12.06 |
| 6,647,605 B2 * | 11/2003 | Hiramoto et al. | ................ | 29/33 P |
| 6,744,228 B1 * | 6/2004 | Cahill et al. | ................ | 318/135 |
| 6,949,844 B2 * | 9/2005 | Cahill et al. | ................ | 310/12.02 |
| 7,524,152 B2 * | 4/2009 | Honegger et al. | ................ | 409/235 |
| RE41,232 E * | 4/2010 | Hazelton et al. | ................ | 310/12.06 |
| 7,971,863 B2 * | 7/2011 | Chen et al. | ................ | 269/8 |
| 8,267,388 B2 * | 9/2012 | Xu | ................ | 269/60 |
| 2011/0220618 A1 * | 9/2011 | Maeno | ................ | 219/101 |

* cited by examiner

*Primary Examiner* — Robert Canfield
*Assistant Examiner* — Brent W Herring
(74) *Attorney, Agent, or Firm* — Mitchell K. McCarthy; McCarthy Law Group

(57) ABSTRACT

An apparatus and associated method for orienting a workpiece during processing. A fixture supports the workpiece adjacent a noncontacting biaser. At least one of the fixture and the biaser are selectively movable in a first direction with respect to the other. The biaser directs a first magnetic force capable of moving the workpiece relative to the fixture in a different second direction without physical contact between the biaser and the workpiece during a travel path segment of movement between the fixture and the biaser. The biaser further directs a second magnetic force capable of moving the workpiece relative to the fixture in a third direction, that is different than the second direction, without physical contact between the biaser and the workpiece during a subportion of the travel path segment of movement between the fixture and the biaser.

21 Claims, 8 Drawing Sheets

NONCONTACT POSITIONING OF A WORKPIECE

SUMMARY

In some embodiments an apparatus is provided that orients a workpiece for processing. The apparatus includes a fixture that operably supports the workpiece. The fixture is selectively movable in a first direction to define a workpiece travel path from a workpiece load position toward a workpiece processing position. The apparatus further includes a biaser adjacent the workpiece travel path that operably directs a first magnetic force capable of moving the workpiece relative to the fixture in a different second direction without physical contact between the biaser and the workpiece, and further directs a second magnetic force capable of moving the workpiece relative to the fixture in a third direction, that is different than the second direction, without physical contact between the biaser and the workpiece.

In some embodiments a method is provided for noncontact positioning of a workpiece. The method includes steps of placing a workpiece at a nonfinal position on a fixture; moving the fixture in a first direction to define a workpiece travel path toward a workpiece processing station; moving the workpiece relative to the fixture from the nonfinal position in a different second direction by directing a first noncontacting magnetic force to the workpiece during the moving the fixture step; and moving the workpiece relative to the fixture in a third direction, that is different than the second direction, by directing a second noncontacting magnetic force to the workpiece during the moving the fixture step.

In some embodiments an apparatus is provided that orients a voice coil magnet (VCM) for attachment to a base of a data storage device assembly. The apparatus includes a fixture that selectively moves the base along a base travel path to a processing station. The apparatus further includes a magnetically permeable positioner that operably directs a magnetic force that slides the VCM relative to the base in a direction different than the base travel path from an initial position to a final position without contacting the VCM.

In some embodiments an apparatus is provided that orients a workpiece for processing. The apparatus includes a fixture supporting the workpiece and a noncontacting biaser. At least one of the fixture and the biaser are selectively movable in a first direction with respect to the other. The biaser directs a first magnetic force capable of moving the workpiece relative to the fixture in a different second direction without physical contact between the biaser and the workpiece during a travel path segment of movement between the fixture and the biaser. The biaser further directs a second magnetic force capable of moving the workpiece relative to the fixture in a third direction, that is different than the second direction, without physical contact between the biaser and the workpiece during a subportion of the travel path segment of movement between the fixture and the biaser.

DESCRIPTION

A manufacturing system for making a device is necessarily built to accommodate the product and performance specifications for the device. High speed automation is a desirable manufacturing system feature for reliability and productivity sake, but can tend to introduce problematic side effects. Particulate contamination, for instance, can occur when high velocity reciprocating end effectors pick and place components to a final assembly orientation, and when mechanical fits are used to positively locate components at the final assembly orientation.

Assembly of a disc drive data storage device is just one illustrative example where these issues arise. A disc drive manufacturing system requires a clean room environment to ensure that stray particulates are not introduced inside the sealed enclosure. This is because the operable clearance between the data transfer members and the respective spinning discs is so small that even microscopic particulates can become wedged therebetween, potentially causing damage to both.

Assembling a lower voice coil magnet (VCM) to the base of a disc drive is yet just one example of a high precision assembly step that is advantageously automated for reliability and productivity sake. The mechanical contact between high velocity end effectors used in picking and placing a VCM to the final assembly position, and the very nature of a high velocity reciprocating end effector itself, can introduce unwanted particulates into the disc drive enclosure. Further, the use of mechanical engagement devices such as pin-in-hole arrangements with the high velocity end effectors to positively position and maintain the VCM on the base can likewise introduce the unwanted particulates in the disc drive enclosure.

Figure 1:
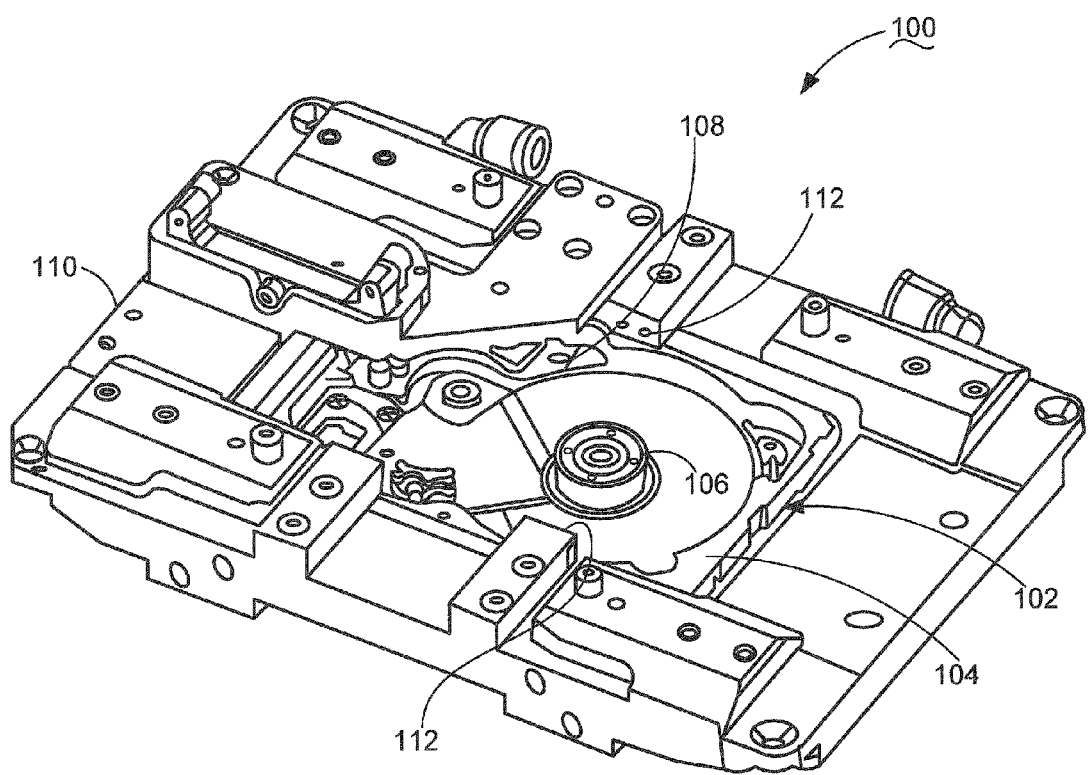
FIG. 1 is an isometric depiction of an apparatus constructed and operated in accordance with the present embodiments.

FIG. 1 is an isometric view of an apparatus 100 that orients a workpiece, such as a base assembly 102 for a disc drive in these illustrative embodiments, for assembly processing. The base assembly 102 includes a base 104 to which various components are attached. In these depicted embodiments, for example, a motor 106 is already attached to the base 104 prior to this assembly processing step. In this assembly processing step a VCM 108 is being finally positioned and then attached to the base 104. In so doing, a fixture 114 (FIG. 2) raises the base 104 upwardly into a nest 110, which includes a frame circumscribing the base 104 and having a number of protuberant features 112 that overhang the path of base 104 travel to prevent any unexpected travel overshoot of the base 104. A reference datum engages the base 104 at the raised operable position, such as but not limited to extensible locating pins (not shown) supported by the nest 110 that engage the base 104.

Figure 2:
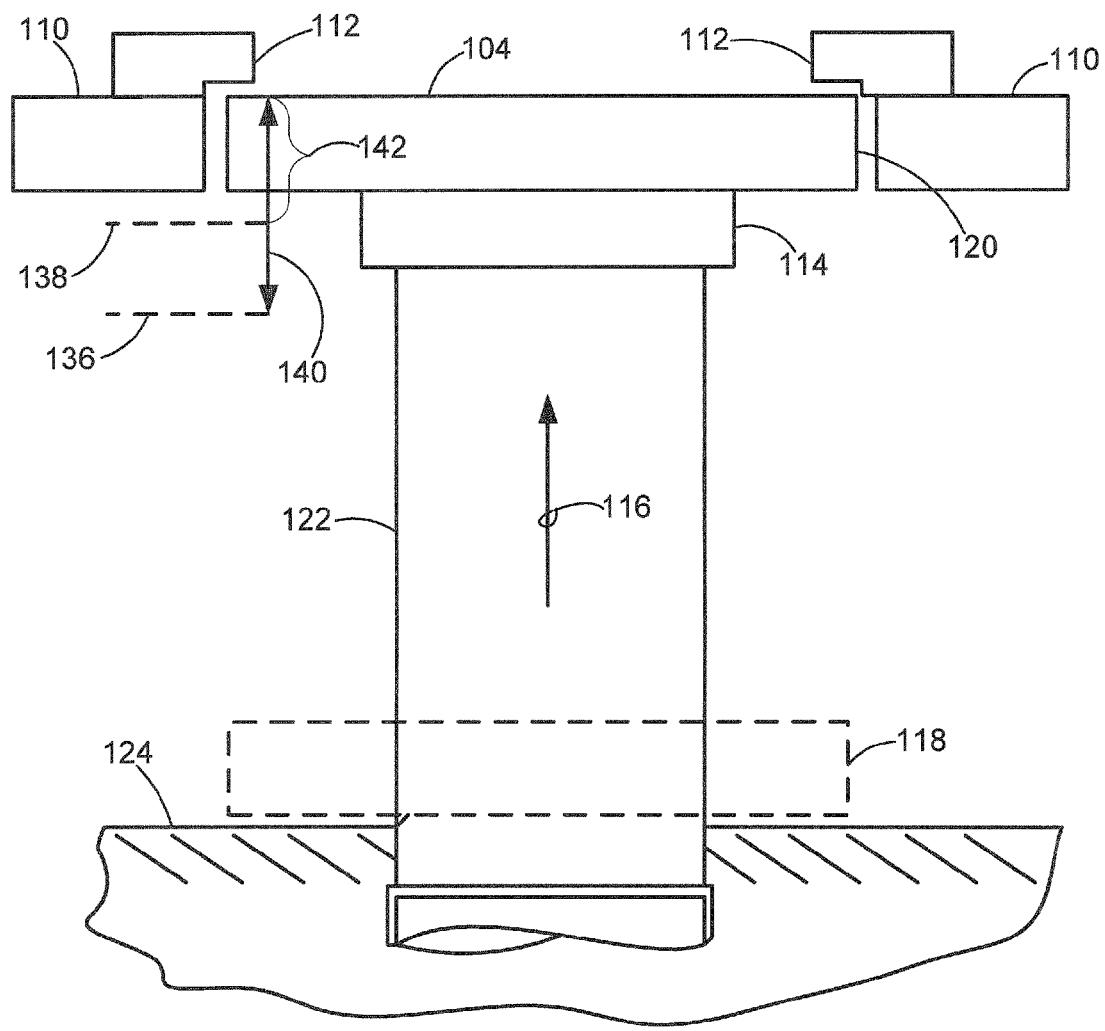
FIG. 2 is a diagrammatic elevational view of the apparatus of FIG. 1.

FIG. 2 diagrammatically depicts the fixture 114 operably supporting the base 104 and selectively moveable upwardly to define a directional base travel path 116 from a base loading position 118 (depicted in phantom) toward the assembly processing position 120. In these illustrative embodiments the selective movement of the fixture 114 is provided by an extensible cylinder 122 supported upon a rigid platform 124.

Figure 3:
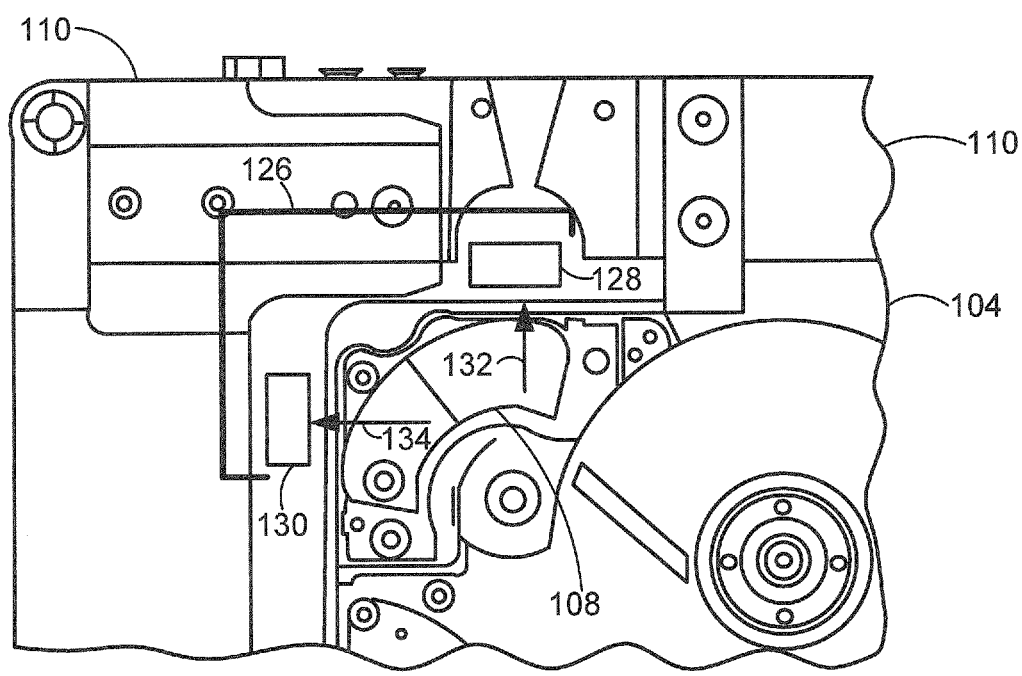
FIG. 3 is a top view of a portion of the apparatus of FIG. 1.

FIG. 3 depicts a top view of a portion of the nest 110 with operable portions removed for clarity sake, and with the base 104 having been raised to the assembly procession position 120 (FIG. 2). The VCM 108 has been loosely placed on the base 104 in a nonfinal position, preferably before raising the base 104 into the nest 110. The apparatus 100 further includes a biaser 126 adjacent to the base 104 during the time the base 104 traverses a segment of its base travel path 116, as discussed below, for noncontactingly moving the VCM 108 to a final assembly orientation where it can be attached to the base 104.

In these illustrative embodiments the biaser 126 has a first ferrite member 128 and a second ferrite member 130, both supported by the nest 110 in a close mating relationship with the base 104 along a segment of its base travel path 116. In alternative equivalent embodiments only one of the biaser 126 and workpiece are magnetic, whereas the other is magnetically permeable. It will also be noted that in these illustrative embodiments the ferrite members 128, 130 are constructed of discrete components although the claimed embodiments are not so limited.

Each of the ferrite members 128, 130 in these illustrative embodiments directs a magnetic force that magnetically couples with the VCM 108 and is thereby capable of moving the VCM 108 relative to the fixture 114 (FIG. 2) without physical contact between the biaser 126 and the VCM 108. That is, the ferrite member 128 directs a first magnetic force capable of sliding the VCM 108 on the base 104 in a direction denoted by 132 that is substantially lateral to the base travel path 116 (FIG. 2). Ferrite member 130 similarly directs a second magnetic force capable of sliding the VCM 108 on the base 104 in a direction denoted by 134 that is substantially orthogonal to the direction 132.

Figure 4:
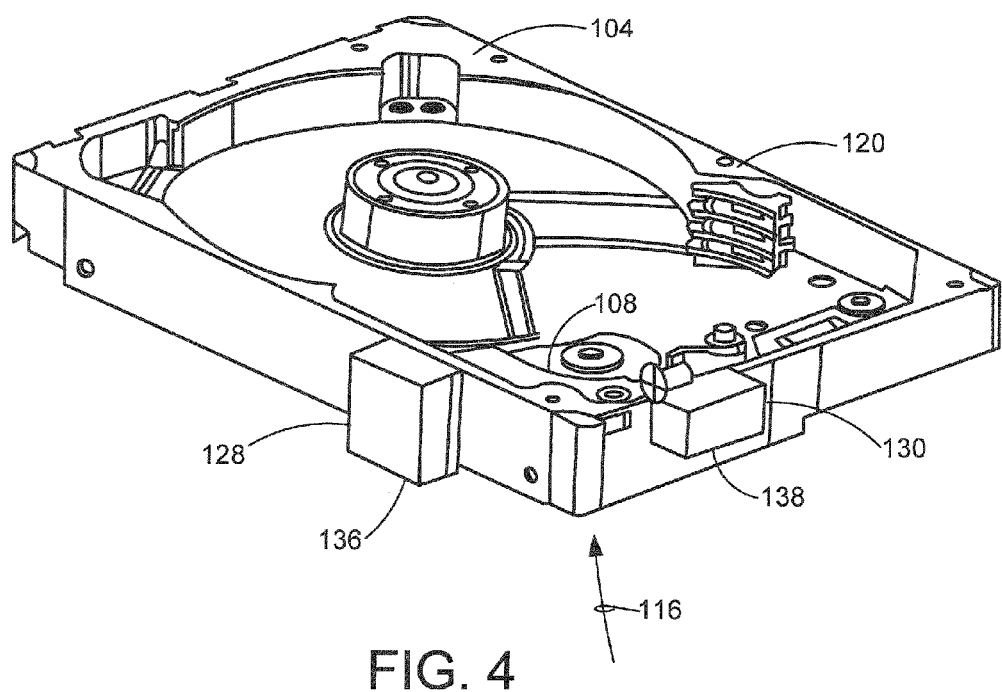
FIG. 4 is an isometric depiction of the workpiece in FIG. 1 with all of the positioner apparatus except the noncontacting biaser removed for clarity sake.

FIG. 4 is an isometric depiction of the base 104 still raised up in the assembly processing position 120 like in FIGS. 1-3, but with all of the nest 110 removed for clarity except for the ferrite members 128, 130 which remain depicted in their respective operable positions adjacent the base 104. The first ferrite member 128 has a leading edge 136, with respect to encountering the base 104 along its base travel path 116 (FIG. 2), that is lower than a like leading edge 138 of the second ferrite member 130. The leading edge 136 of the ferrite member 128 is useful in FIG. 2 in depicting a segment of the base travel path 116, referred to herein as a base travel path segment 140, approximating the segment of travel over which the first ferrite 128 directs the first magnetic force to the extent it is capable of sliding the VCM 108 while the base 104 traverses its base travel path 116. A subportion 142 of the base travel path segment 140, similarly defined by the leading edge 138 of the ferrite member 130, likewise approximates a subportion of the segment 140 over which the second ferrite 130 also directs the second magnetic force to the extent it is capable of sliding the VCM 108 while the base 104 traverses its base travel path 116. For purposes of this description and meaning of the claims, a "non-subportion" of the base travel path 116 is that portion of the base travel path segment 140 that is not in the subportion 142.

Figure 5:
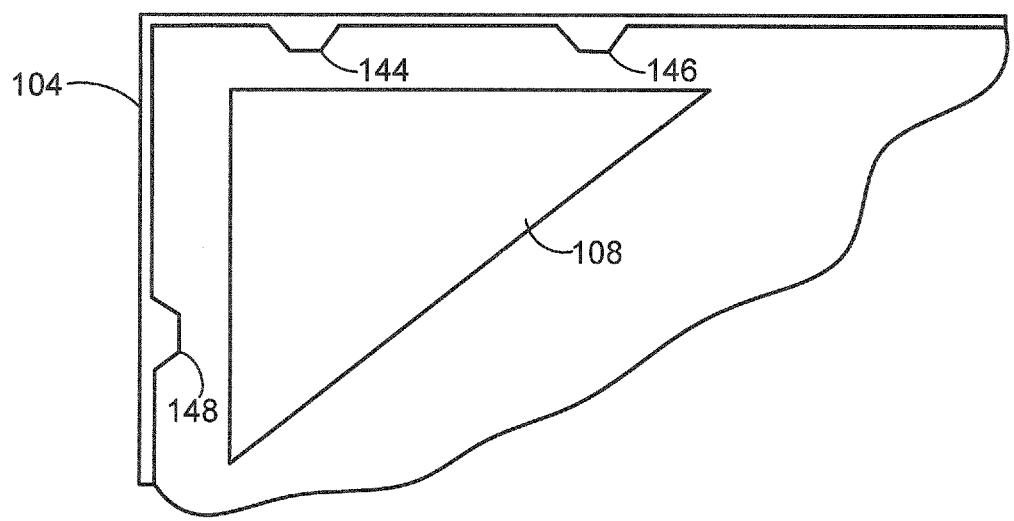
FIG. 5 is a diagrammatic depiction of the workpiece roughly positioned.

FIG. 5 diagrammatically depicts the VCM 108 roughly and loosely positioned on the base 104, before the VCM 108 encounters either of the magnetic forces directed by the ferrites 128, 130 as the base 104 traverses its base travel path 116. This rough positioning permits placing the VCM 108 within an area defined by a large tolerance. The present embodiments then finally position the VCM 108 without contactingly engaging it.

Figure 6:
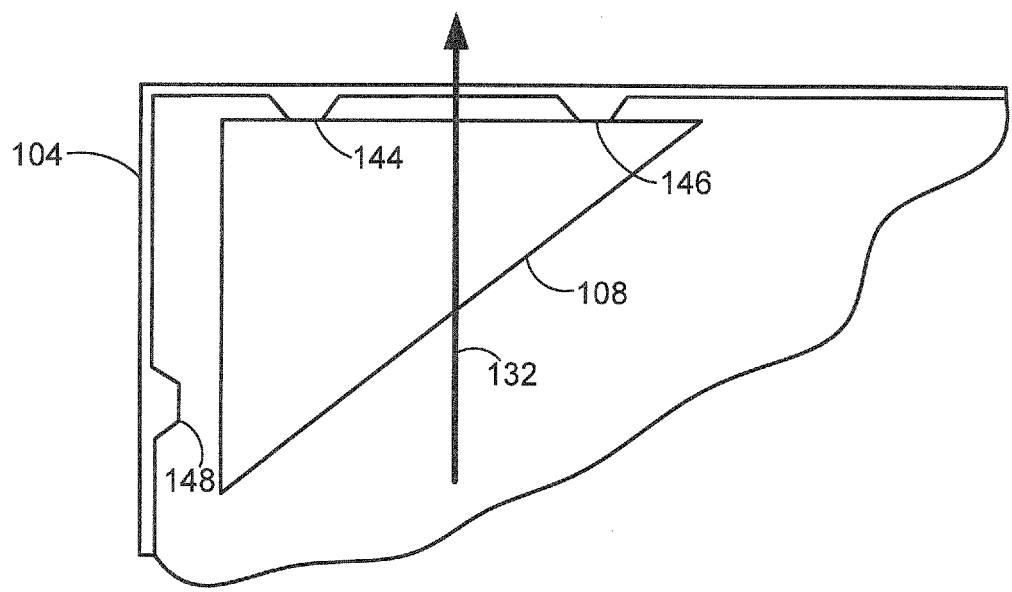
FIG. 6 is a view similar to FIG. 5 but depicting the workpiece having been positioned by the first magnetic force.
Figure 7:
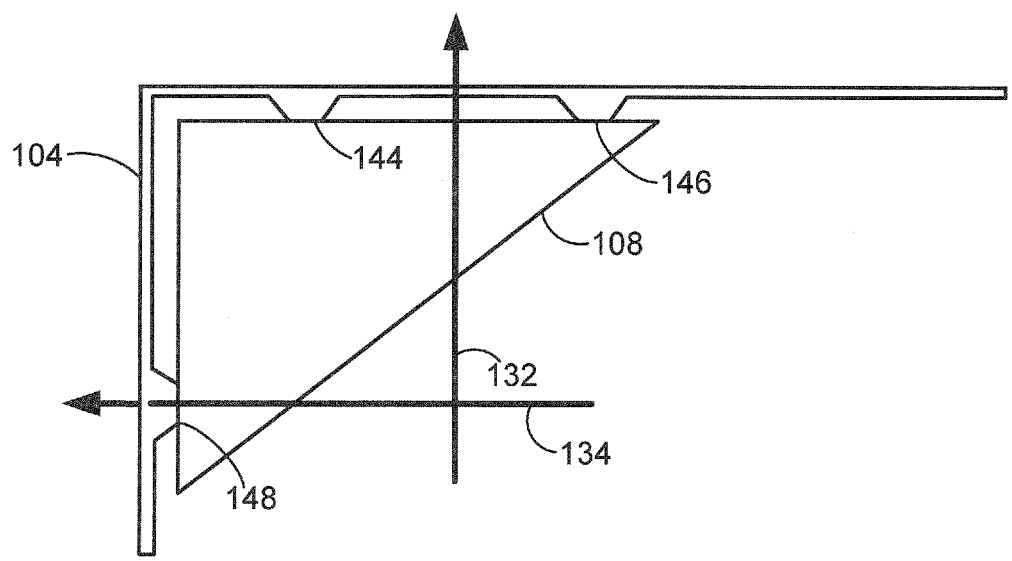
FIG. 7 is a view similar to FIG. 6 but depicting the workpiece having been additionally positioned by the second magnetic force.

FIG. 6 is a view similar to FIG. 5 but depicting the influence of the first ferrite 128 directing the first magnetic force to urge the VCM 108 toward and eventually to pressingly engage against a pair of spatially separated datum surfaces 144, 146. The use of two or more spatially separated datum surfaces improves the alignment with which the VCM 108 is biased by the first ferrite 128. FIG. 7 depicts the influence of the second ferrite 130 directing the second magnetic force to urge the VCM 108 toward and eventually to pressingly engage against a datum surface 148. This places the VCM 108 in a desired final orientation suited for attaching it to the base 104. For instance, this desired final orientation might align a clearance aperture in the base 104 with a threaded aperture in the VCM 108 permitting a threaded fastener to be admitted to affix the VCM 108 to the base 104. In some embodiments the first and second magnetic forces are sufficient to retain the components while they are affixed together. Alternatively, additional support can be provided by a fixed or retractable clamp.

Preferably, the base travel path segment 140 (FIG. 2) is comparatively longer than the subportion 142, in relation to the speed with which the base 104 traverses its base travel path 116, to permit the VCM 108 to pressingly engage against the multiple datum 144, 146 before being moved by the second ferrite 130. That prevents the VCM 108 from becoming wedged in some orientation other than the desired final orientation such that attachment features align for attaching the VCM 108 to the base 104. Also preferably, the first magnetic force remains in effect throughout the base travel segment 140 (FIG. 2) so that the first magnetic force continues to urge the VCM 108 against the datum surfaces 144, 146 all the while the second magnetic force is urging the VCM 108 toward and eventually against the datum surface 148.

The described embodiments are illustrative, and in no way limiting of the contemplated embodiments of the present invention. For example, in alternative embodiments it might be advantageous to fix the base 104 in place and move the biaser 126 relative to the base 104 to direct the first and second magnetic forces in similar manner and effect to that described above. Alternatively, it might be advantageous to move both the fixture 114 and the biaser 126.

Figure 8:
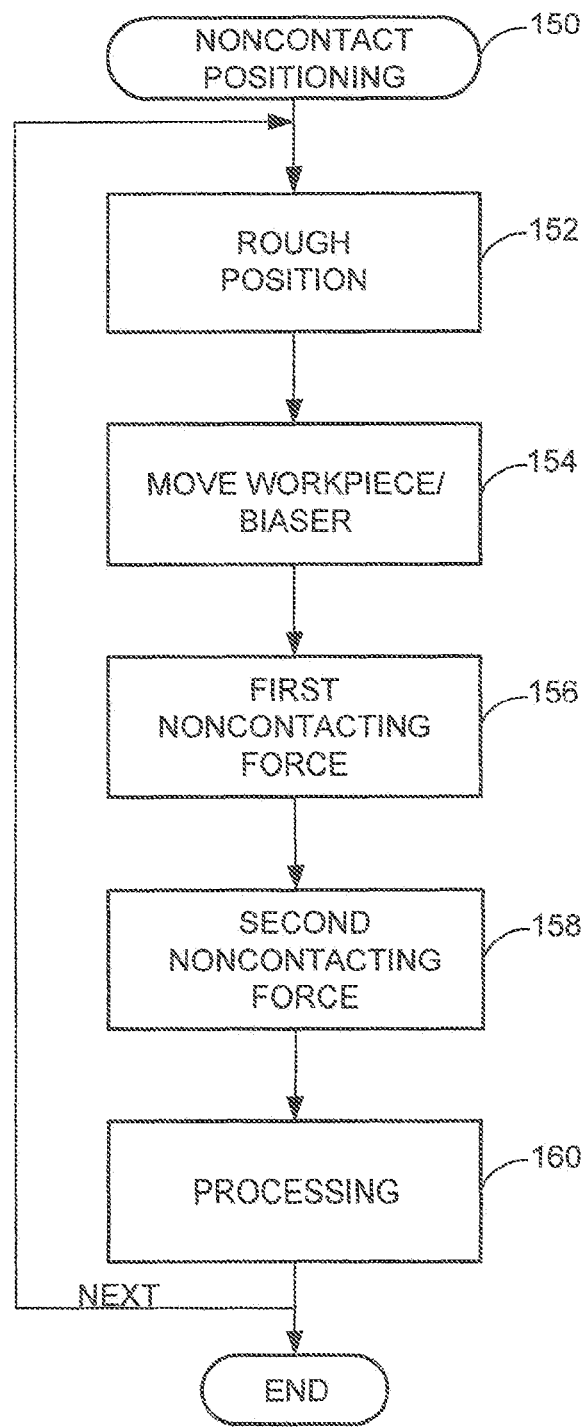
FIG. 8 is a flowchart depicting steps in a method for NONCONTACT POSITIONING in accordance with embodiments of the present invention.

FIG. 8 is a flowchart depicting illustrative steps in a method for NONCONTACT POSITIONING in accordance with embodiments of the present invention. The method begins in block 152 with roughly positioning the workpiece on the fixture, as illustratively depicted in FIG. 5. In the illustrative embodiments the workpiece includes the base, supported directly by the fixture, and the VCM supported, in turn, by the base. In alternative embodiments the workpiece being noncontactingly moved, the VCM in the illustrative embodiments, can be directly supported on the fixture. The fixture then moves the workpiece in block 154 toward the processing station. As described, in equivalent alternative embodiments the fixture might be fixed and the biaser moved selectively toward the workpiece, or both the biaser and the fixture might move selectively.

In block 156 the workpiece is moved relative to the fixture in a different second direction from the nonfinal position by directing the first noncontacting magnetic force to the workpiece. Again, in the illustrative embodiments the VCM slides on the base which is, in turn, supported on the fixture. Alternatively, the workpiece being noncontactingly moved, the VCM in the illustrative embodiments, can be directly supported on the fixture and slide thereon. The first noncontacting magnetic force is directed to the workpiece at the processing station and throughout the workpiece travel path segment to urge the workpiece toward a datum.

In block 158 the workpiece is also moved relative to the fixture in a third direction, different than the second direction, by directing the second noncontacting magnetic force to the workpiece. In the described illustrative embodiments the second and third directions are substantially orthogonal. The second noncontacting magnetic force is directed to the workpiece at the processing station and throughout the subportion of the workpiece travel path segment to urge the workpiece toward another datum.

Preferably, the steps 156, 158 are characterized by the workpiece travel path segment being comparatively long in relation to the subportion so that the workpiece is urged by the first magnetic force to pressingly engage against the datum surface before encountering the second magnetic force to the extent that it moves the workpiece in the third direction. Also preferably, the first magnetic force continues to urge the workpiece toward the first datum all the while the second magnetic force is urging the workpiece toward the second datum. The completion of steps 156, 158 result in the workpiece being moved to a predetermined orientation that is suited for processing in block 160, such as affixing the workpiece in place.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and values for the described variables, within the principles of the present embodiments to the full extent indicated by the broad general meaning of the terms.

What is claimed:

1. An apparatus that orients a workpiece for processing, the apparatus comprising:
   a fixture operably supporting the workpiece, the fixture selectively movable in a first direction to define a workpiece travel path; and
   a biaser adjacent the workpiece travel path operably directing a first magnetic force capable of moving the workpiece relative to the fixture in a different second direction without physical contact between the biaser and the workpiece, and further directing a second magnetic force capable of moving the workpiece relative to the fixture in a third direction, that is different than the second direction, without physical contact between the biaser and the workpiece.

2. The apparatus of claim 1 wherein the second direction is substantially orthogonal to the third direction.

3. The apparatus of claim 1 wherein the biaser directs the first magnetic force to the workpiece at a processing station and along a workpiece travel path segment, and the biaser directs the second magnetic force to the workpiece at the processing station and along a subportion of the workpiece travel path segment.

4. The apparatus of claim 3 wherein the first magnetic force urges the workpiece toward a first datum and the second magnetic force urges the workpiece toward a different second datum.

5. The apparatus of claim 4 wherein as the fixture is moved outside the subportion of the workpiece travel path segment only the first magnetic force urges the workpiece toward the first datum, and as the fixture is moved within the subportion of the workpiece travel path segment the second magnetic force urges the workpiece toward the second datum.

6. The apparatus of claim 5 wherein the second magnetic force urges the workpiece toward the second datum while the first magnetic force urges the workpiece toward the first datum.

7. The apparatus of claim 5 wherein the first magnetic force urges the workpiece to a pressing engagement against a surface of the first datum before the second magnetic force urges the workpiece toward the second datum.

8. The apparatus of claim 7 wherein the first magnetic force urges the workpiece to a pressing engagement against two or more spaced-apart surfaces of the first datum before the second magnetic force urges the workpiece toward the second datum.

9. The apparatus of claim 5 wherein the first magnetic force urges the workpiece to a pressing engagement against the first datum and the second magnetic force urges the workpiece to a pressing engagement against the second datum in a predetermined orientation of the workpiece suited for processing.

10. The apparatus of claim 1 wherein the biaser comprises a discrete first magnetically permeable member directing the first magnetic force and a discrete second magnetically permeable member directing the second magnetic force.

11. A method for noncontact positioning of a workpiece, comprising:
    placing a workpiece at a nonfinal position on a fixture;
    moving the fixture in a first direction to define a workpiece travel path toward a workpiece processing station having a biaser;
    moving the workpiece relative to the fixture from the nonfinal position in a different second direction via a first noncontacting magnetic force from the biaser to the workpiece during the moving the fixture step; and
    moving the workpiece relative to the fixture in a third direction, that is different than the second direction, via a second noncontacting magnetic force from the biaser to the workpiece during the moving the fixture step.

12. The method of claim 11 wherein the moving the workpiece steps are characterized by the second direction being substantially orthogonal to the third direction.

13. The method of claim 11 wherein the moving the workpiece steps are characterized by directing the first noncontacting magnetic force to the workpiece at the workpiece processing station and along a workpiece travel path segment, and directing the second noncontacting magnetic force to the workpiece at the workpiece processing station and along a subportion of the workpiece travel path segment.

14. The method of claim 11 wherein the moving the workpiece steps are characterized by the first noncontacting magnetic force urging the workpiece toward a first datum and the second noncontacting magnetic force urging the workpiece toward a second datum.

15. The method of claim 14 wherein the moving the workpiece steps are characterized by only the first magnetic force urging the workpiece toward the first datum when the fixture is moved outside the subportion of the workpiece travel path segment, and the second magnetic force urging the workpiece toward the second datum when the fixture is moved within the subportion of the workpiece travel path segment.

16. The method of claim 15 wherein the moving the workpiece steps are characterized by the second noncontacting magnetic force urging the workpiece toward the second datum when the first noncontacting magnetic force is urging the workpiece toward the first datum.

17. The method of claim 16 wherein the moving the workpiece steps are characterized by the first noncontacting magnetic force urging the workpiece to a pressing engagement against a surface of the first datum before the second noncontacting magnetic force urges the workpiece toward the second datum.

18. The method of claim 17 wherein the moving the workpiece steps are characterized by the first noncontacting magnetic force urging the workpiece against the first datum and the second noncontacting magnetic force urging the workpiece to a pressing engagement against the second datum in a predetermined orientation of the workpiece suited for processing.

19. An apparatus comprising:
a fixture that is capable of moving a base of a data storage device along a base travel path; and
a magnetically permeable positioner that operably directs a magnetic force that is capable of sliding a voice coil magnet (VCM) relative to the base in a direction different than the base travel path from an initial position to a final position without contacting the VCM.

20. The apparatus of claim 19 wherein the magnetically permeable positioner comprises:
a first magnetically permeable member that directs a first magnetic force to the VCM at the processing station and along a base travel path segment, and
a second magnetically permeable member that directs a second magnetic force to the VCM at the processing station and along a subportion of the base travel path segment.

21. An apparatus comprising a fixture supporting a workpiece and a noncontacting biaser, at least one of the fixture and the biaser capable of being selectively moved in a first direction relative to the other, the biaser directing a first magnetic force capable of moving the workpiece relative to the fixture in a different second direction without physical contact between the biaser and the workpiece, and the biaser further directing a second magnetic force capable of moving the workpiece relative to the fixture in a third direction, that is different than the second direction, without physical contact between the biaser and the workpiece.

* * * * *